(12) United States Patent
Gentry et al.

(10) Patent No.: US 7,256,364 B2
(45) Date of Patent: Aug. 14, 2007

(54) METHOD FOR SIMULTANEOUS RESISTANCE BRAZING OF ADJACENT CONDUCTOR JOINTS

(75) Inventors: Ronald Gentry, Cicero, IN (US); Richard A. Van Sickle, Noblesville, IN (US); Christopher Congdon, Fishers, IN (US)

(73) Assignee: Remy International, Inc., Anderson, IN (US)

( * ) Notice: Subject to any disclaimer, the term of this patent is extended or adjusted under 35 U.S.C. 154(b) by 431 days.

(21) Appl. No.: 11/018,652

(22) Filed: Dec. 21, 2004

(65) Prior Publication Data

US 2006/0131279 A1 Jun. 22, 2006

(51) Int. Cl.
*B23K 1/00* (2006.01)

(52) U.S. Cl. .................................. 219/85.15

(58) Field of Classification Search ............. 219/85.14, 219/85.15, 85.18, 56.1, 56.22; 29/850
See application file for complete search history.

(56) References Cited

U.S. PATENT DOCUMENTS

| | | | |
|---|---|---|---|
| 2,487,985 A * | 11/1949 | Ruben | ...................... 219/85.14 |
| 3,592,993 A * | 7/1971 | Bennett | .................... 219/85.15 |
| 4,757,601 A | 7/1988 | Leech et al. | |
| 5,032,703 A | 7/1991 | Henschen et al. | |
| 5,059,756 A | 10/1991 | Henschenp et al. | |
| 5,118,026 A | 6/1992 | Stacher | |
| 5,330,097 A * | 7/1994 | Inoue | ....................... 219/85.15 |
| 5,508,571 A | 4/1996 | Shafer, Jr. | |
| 5,736,707 A | 4/1998 | Nied et al. | |
| 6,181,043 B1 | 1/2001 | Kusase et al. | |
| 6,353,198 B1 | 3/2002 | Tong et al. | |
| 2002/0041129 A1 | 4/2002 | Oohashi et al. | |
| 2003/0061704 A1 | 4/2003 | Nosal, II et al. | |

* cited by examiner

*Primary Examiner*—Clifford C. Shaw
(74) *Attorney, Agent, or Firm*—Ice Miller LLP (57) ABSTRACT

A method for simultaneously brazing adjacent conductor joints comprises the steps of arranging at least two pair of conductor joints in a row placing a brazing compound between the pairs of joints desired to be electrically connected placing a conductive spacer between the pairs not to be brazed and passing an electrical current through the row of conductors until the brazing compound melts joining the conductor joints. The spacer can then be removed thereby maintaining the proper spacing between the pairs of brazed conductor joints. The multiple rows of conductor joints can be arranged adjacent one another so that they can be moved between brazing electrodes sequentially thereby allowing a continuous brazing operation of multiple rows of conductor joints. The brazing compound may be a continuous ribbon of brazing compound which extends between the multiple rows of conductor joints.

10 Claims, 7 Drawing Sheets

METHOD FOR SIMULTANEOUS RESISTANCE BRAZING OF ADJACENT CONDUCTOR JOINTS

BACKGROUND OF THE INVENTION

The present invention relates to a method for simultaneously resistance brazing multiple conductor joints and more particularly for the method of simultaneous resistance brazing of adjacent conductor joints in the windings of stators for alternators, generators, and dynamo-electric machines.

It is extremely difficult to perform resistance brazing of adjacent parts which are arranged in multiple rows and columns because of the difficulty in acquiring tooling of the proper size, shape and strength for the electrodes of a resistance welder/brazer within the small spaces that typically exist between such rows and columns particularly in stator windings for electrical alternators, generators and motors.

Because of the costs and difficulty of fabricating stator cores and other windings in electrical generators and alternators using a single continuous wire in the winding process, such windings are typically fabricated from a multiplicity of individual conductor segments or "hairpins" which are preformed and adapted to be placed into slots or grooves in, for example, a stator core. These hairpin conductors must be joined to one another at their end portions to form the stator winding for the dynamo-electric machine. Various prior art methods have been used to join the end portions of the conductors to form the stator winding including soldering, welding, and brazing. For example, U.S. Patent Application No. US2002/0041129A1-Oohashi, et al., published Apr. 11, 2002 demonstrates a number of such techniques. As illustrated in the Oohashi application, the respective end portions of the conductors are brazed by placing a brazing compound between the respective joints and then applying an electrical current through electrodes so that the brazing compound is heated and melted to join the conductors together.

Oohashi also discloses that a technique of brazing multiple joints arranged in rows by placing a brazing compound between the joints to be brazed and then pressing the entire row together between electrodes so that the electrical current flows through the entire row melting the brazing compound and joining the respective conductive joints. For example, as illustrated in FIG. 6 of Oohashi adjacent pairs of contacts are pressed together with the electrodes to form an electrical path for the resistance brazing of the joints. One disadvantage of the method disclosed in Oohashi is that the pressure applied by the electrodes necessary to form an electrical connection through an entire row of electrodes can cause the metal of the conductors to bend or deform so that there is an undesirable electrical contact between adjacent pairs of the conductors which results in improper operation of the stator core. It is important to maintain the proper spacing between adjacent pairs of conductors so that the electrical current does not flow between the respective pairs during operation of the dynamo-electric machine.

Thus, it would be a desirable advance in the art to provide a method of simultaneously brazing multiple pairs of conductor end portions arranged in a row simultaneously without bending or distorting the spacing between the respective pairs of conductor end portions.

BRIEF DESCRIPTION OF THE INVENTION

A method of brazing adjacent conductor joints in accordance with the present invention comprises arranging at least a first pair and a second pair of conductor joints in a row. The first pair of joints comprises a first conductor end portion and a second conductor end portion and the second pair of conductor joints comprises a third conductor end portion and a fourth conductor end portion. A brazing compound is placed between the first and second end portions of the first pair of conductor joints and between the third and fourth end portions of the second pair of conductor joints. However, no brazing compound is placed between the second end portion of the first pair and the third end portion of the second pair. A conductive spacer is placed between the second end portion of the first pair of conductor joints and the third end portion of the second pair of conductor joints to maintain the spacing between the respective end portions. Electrical current is then passed through the entire row comprising the first pair of conductor joints and the conductive spacer and the second pair of conductor joints to cause a brazing compound to melt and braze the first and second end portions together and the third and fourth end portions together.

The step of passing the electrical current through the row may comprise the step of placing the row of conductor joints between a first and a second electrode so that the first end portion of the first pair is next to the first electrode and the fourth end portion of the second pair is next to the second electrode, and then pressing the first and second electrodes towards one another to form electrical contact with the row. Electrical potential can then be applied across the first and second electrodes to cause electrical current to flow through the row and melt the brazing compound.

The conductive spacer may comprise any electrically conductive material but typically is fabricated from copper. The spacer is dimensioned to maintain the normal spacing between the second end portion of the first pair of conductor joints and the third end portion of the second pair of conductor joints so that when the electrodes are pressed together, there is no bending or deformation of the pairs of conductors.

The method in accordance with the present invention may also comprise arranging a multiplicity of conductor pairs in first, second and additional rows as, for example, when placed in the grooves of a stator core. Brazing compound can be placed between the respective end portions of the pairs of conductor joints that are to be brazed and then the conductive spacers are placed between the respective pairs to maintain the spacing between each of the pairs in the row. The row can then be positioned between electrodes and the electrodes compressed to form an electrical connection. Electrical current can then be passed through the row to cause the brazing compound to melt and braze respective end portions of the respective pairs of conductor joints together.

Once that first brazing operation is completed, the electrodes can be moved back and a second row of conductor joints placed between the electrodes and the brazing operation conducted again. Accordingly, multiple joints can be simultaneously brazed together in rows and the respective rows can be indexed between the electrodes sequentially until the conductors of an entire stator core are brazed.

To facilitate the operation, an elongated ribbon of brazing compound can be placed between the end portions of respective pairs across each of the rows. When the electrical current is applied, the ribbon will melt leaving a space between the row being brazed and the next subsequent row.

Once the entire brazing operation is completed, the spacers can be removed to assure that the proper spacing is maintained between the respective pairs of conductors and that there is no improper electrical current flowing between the pairs of conductor of each of the respective rows.

DESCRIPTION OF THE PREFERRED EMBODIMENTS

Figure 1:
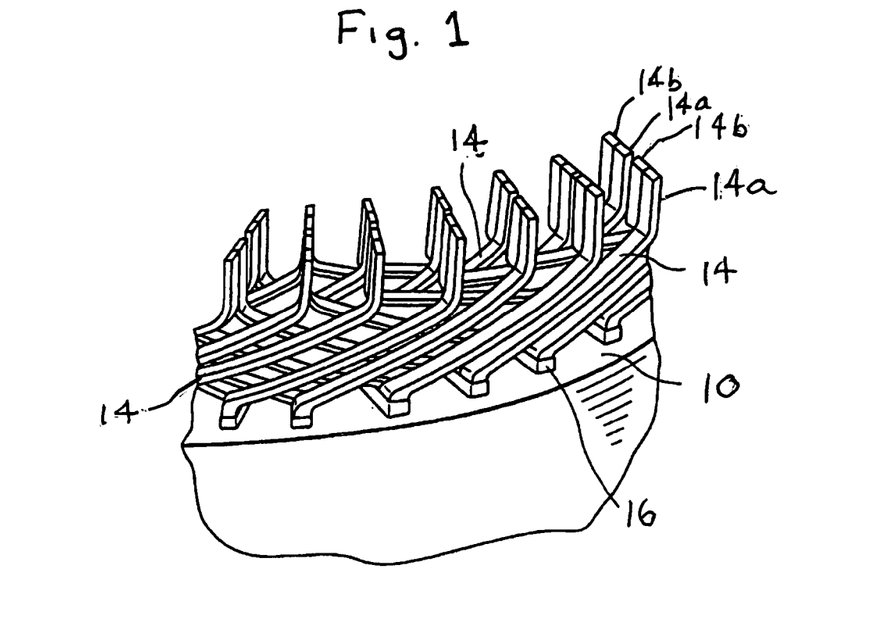
FIG. 1 is a fragmentary perspective few of a stator core with hairpin conductor segments forming the winding.
Figure 2:
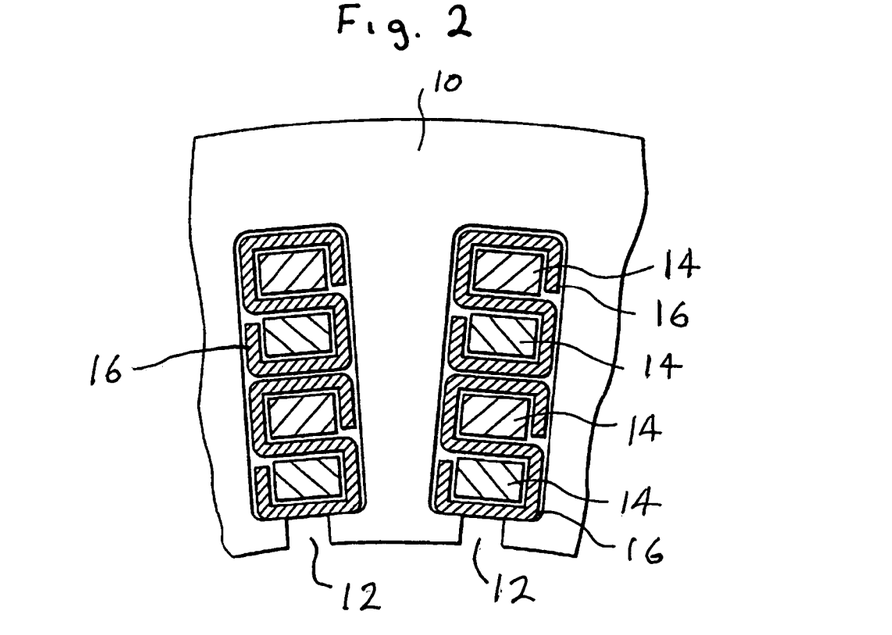
FIG. 2 is a cross sectional view showing a part of the stator of FIG. 1.
Figure 3:
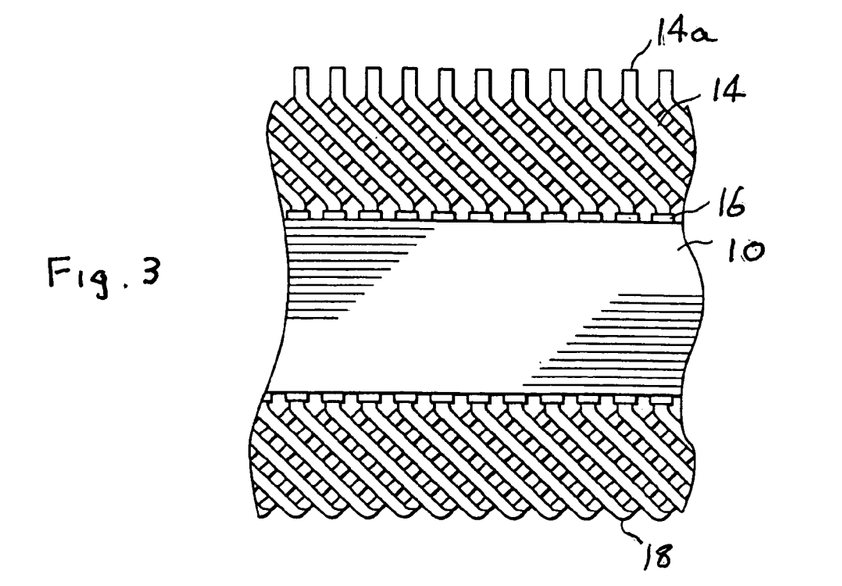
FIG. 3 is a top partially fragmentary view of the stator of FIG. 1.

FIGS. 1, 2 and 3 illustrate a typical stator core with windings for an alternating current generator, alternator, or dynamo-electric machine. While not illustrated in detail, a typical generator or alternator comprises an annular stator which serves as an armature and a rotor which rotates within the stator which serves as a field. The rotor has magnetic properties and as it rotates within the stator, the magnetic field induces current to flow on the stator windings. The current so induced is alternating current which may be rectified into direct current if, for example, the alternator is used in an automobile.

With reference to FIGS. 1, 2 and 3, stator core 10 typically comprises a plurality of laminated annular metal plates joined together. The stator core has a multiplicity of spaced slots 12 formed around the interior perimeter of the stator and a plurality of conductor segments 14 are positioned in the slots and insulation 16 is positioned around the conductor segments to electrically isolate the segments from one another and from the stator core. Insulation 16 can also comprise an insulative coating applied directly to the conductor segments.

Figure 5:
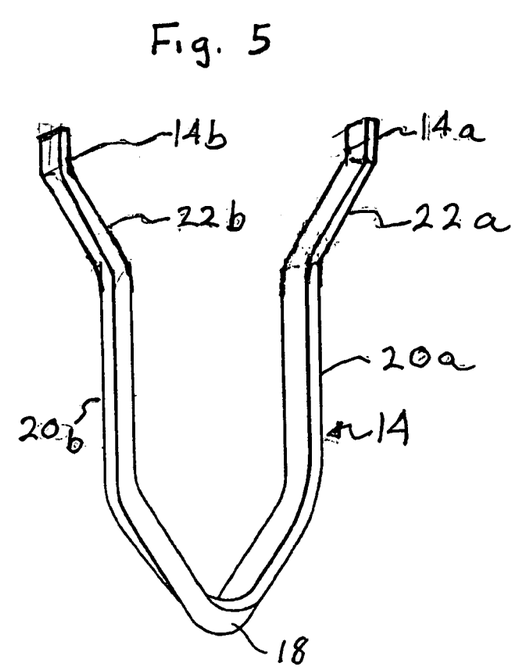
FIG. 5 is a respective view of a U-shaped stator winding conductor segment of the type shown in FIG. 1.

With reference to FIG. 5, each of the conductor segments 14 has an end portion 14a at one end and an end portion 14b at the opposite end. As illustrated in FIG. 5, the conductor segment 14 is generally U-shaped with a bent intermediate portion 18 connected to linear portions 20a and 20b which are dimensioned and arranged to fit into adjacent slots 12 of core 10 respectively. Joined to linear portions 20a and 20b are bent end portions 22a and 22b which terminate at end portions 14a and 14b respectively. Additionally, bent portion 22b and end portion 14b are bent to be slightly off-set from the plane formed by portions 18 and 20a, 22a and end portion 14a so that when conduction segment 14 is placed into slots 12, end portion 14b will be immediately adjacent an end portion 14a of a subsequent conductor segment as shown in FIG. 1.

Figure 4:
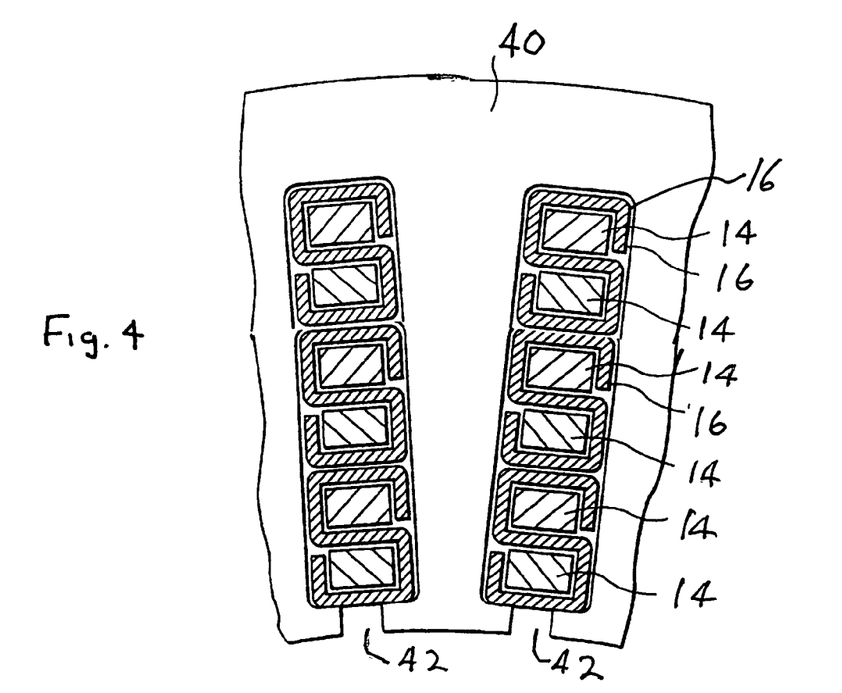
FIG. 4 is a cross sectional view of a modified stator having an additional pair of conductor segments.

FIG. 4 illustrates a variation of the stator core. In FIG. 4, stator core 40 has a series of slots 42 formed around interior periphery of the core. Slots 42 are long enough to allow 3 pairs of conductor segments 14 to be positioned within slots 42.

Figure 6:
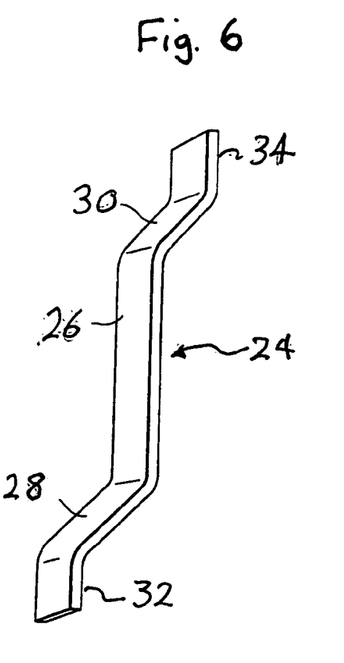
FIG. 6 is an alternative design of a winding conductor segment.
Figure 7:
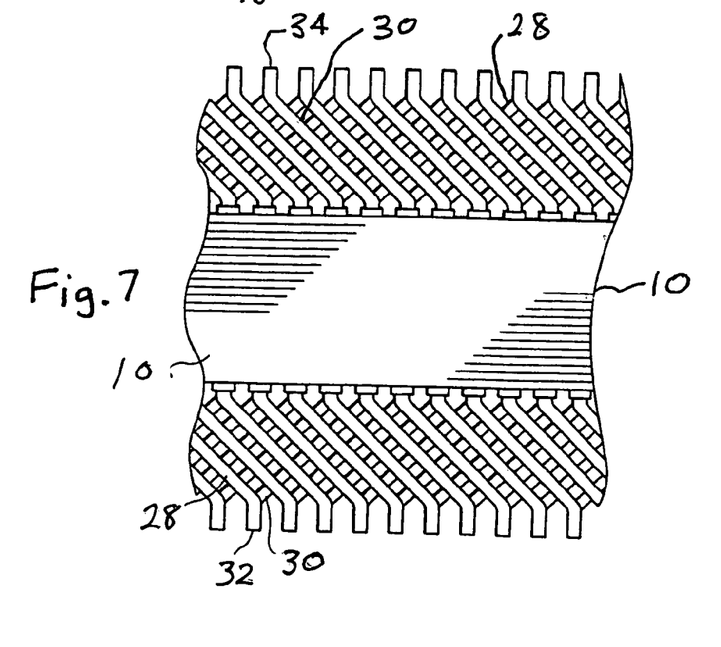
FIG. 7 is a top partially fragmentary view of a stator core showing the conductor segments of FIG. 6 arranged in a winding.

FIGS. 6 and 7 illustrate an alternative configuration for the conductors of a stator core. In FIG. 6, conductor segment 24 comprises a linear central portion 26, curve portions 28 and 30 and end portions 32 and 34.

Figure 8:
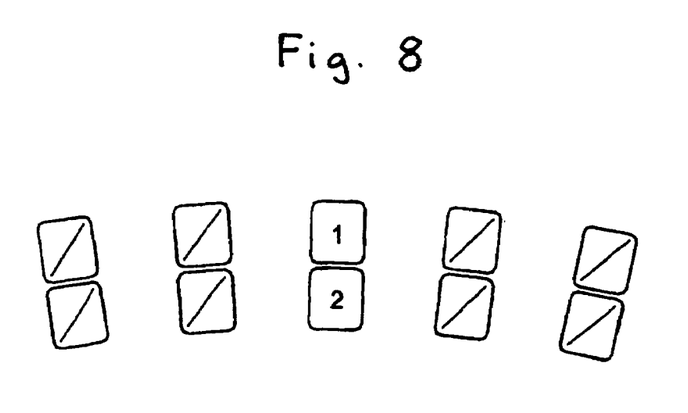
FIG. 8 is an illustration of the end portions of conductor segments as they might be arranged in a stator core.

As illustrated in FIG. 7, respective segments 24 can be arranged in slots 12 of stator core 10 so that the end portions 32 and 34 of respective overlap and can be joined together to form a continuous winding. It will be noted that both ends 32 and 34 must be brazed to the next adjacent conductor segment to form a winding With reference to FIG. 8, illustrated is a graphic representation of single pairs of end portions of conductor segments arranged in a stator core.

Figure 9:
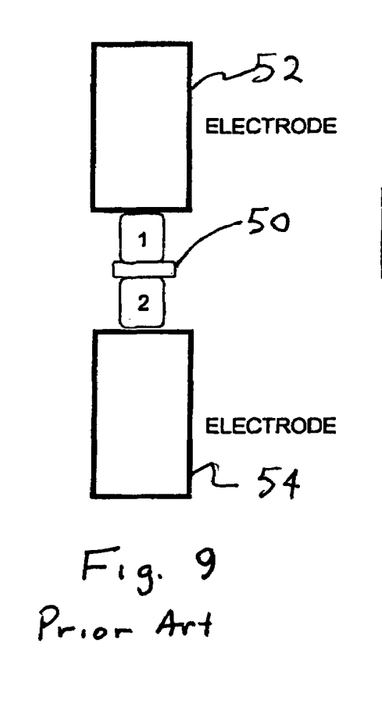
FIG. 9 illustrates a prior art method of electrical resistance brazing of conductor pairs.
Figure 10:
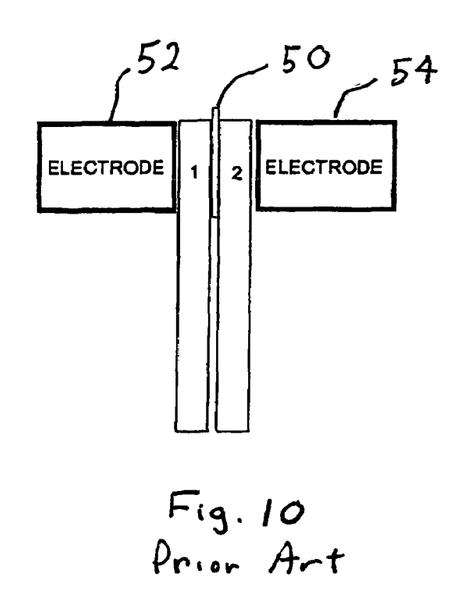
FIG. 10 is a side view of the prior art method illustrated in FIG. 9.

With reference to FIGS. 9 and 10, the prior art method of brazing segment end portions 1 and 2 together is illustrated. A brazing compound 50 is placed between conductor segment end portions 1 and 2 and electrodes 52 and 54 of a conventional resistance welding system are compressed against the end portions 1 and 2 and electrical current is caused to flow between electrode 52 and 54 by the application of electrical potential across electrodes 52 and 54. Thus, current flows from electrode 52 through segment 1 through brazing compound 50 through electrode 2 to electrode 54. This causes brazing compound 50, which has much higher resistance than conductors 1 and 2, to heat and melt to form a brazed joint between segments 1 and 2 establishing an electrical connection between the end portions of segments 1 and 2.

Figure 13:
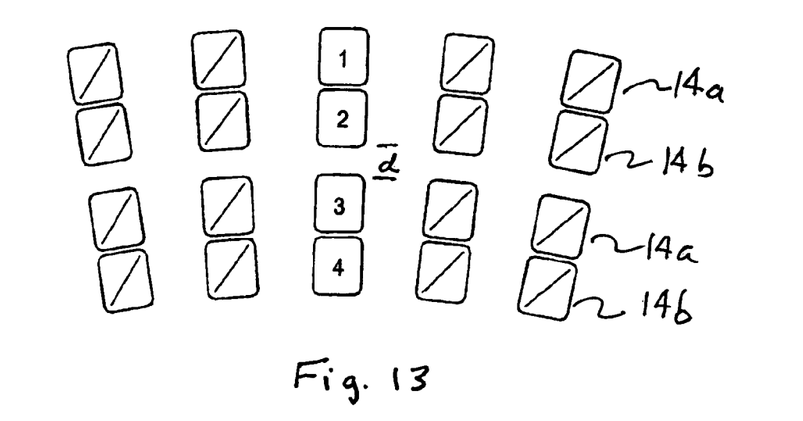
FIG. 13 is an illustration of the arrangement of the end portions of multiple pairs of conductor end portions arranged in rows on a stator.

With reference to FIG. 13, a graphical illustration of two pairs of conductor end portions arranged in a row in a stator core is illustrated. Pairs of end portion conductor segments 1 and 2, and conductor segments 3 and 4 are normally spaced apart by a distance "d." Distance "d" is too small to allow an electrode 52 or 54 to be inserted to weld one pair at a time.

Figure 11:
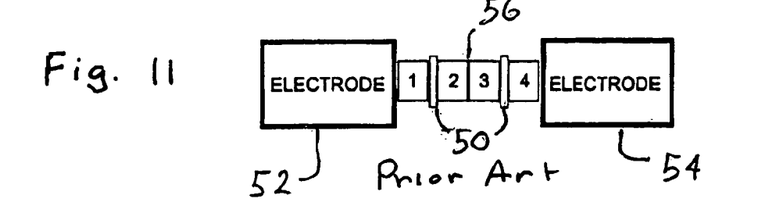
FIG. 11 is an illustration of a prior art method of electrical resistance brazing of a row of multiple pairs of conductors.
Figure 12:
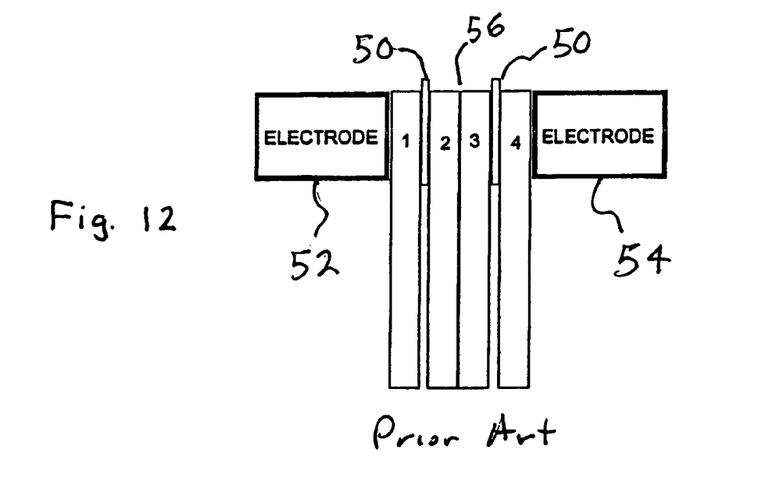
FIG. 12 is a side view of the method illustrated in FIG. 11.

FIGS. 11 and 12 illustrates prior art technique of simultaneously brazing the end portions of conductor segments 1 and 2 together and 3 and 4 together. A brazing compound 50 is placed respectively between end portions 1 and 2 and end portions 3 and 4 as illustrated in FIGS. 11 and 12. Electrodes 52 and 54 are pressed against the row of conductor end portions 1, 2, 3 and 4 an electrical current is passed through the row. Because the electrical insulation has been removed from the end portions of conductors 1, 2, 3 and 4, direct electrical connection is formed between end portions 2 and 3 at junction 56 as a result of the direct physical contact. However, it will be noted in FIG. 13 that there is a normal spacing "d" between conductor end portions 2 and 3 which is desirable to be maintained. If, as a result of the brazing operation illustrated in FIGS. 11 and 12, the conductor leads are bent during the brazing operation so that the space between end portions 2 and 3 is either eliminated or so substantially reduced that arcing can occur, operation of the alternator will be adversely affected. Thus, it is desirable to maintain the proper spacing "d" between the conductor end portions.

Figure 14:
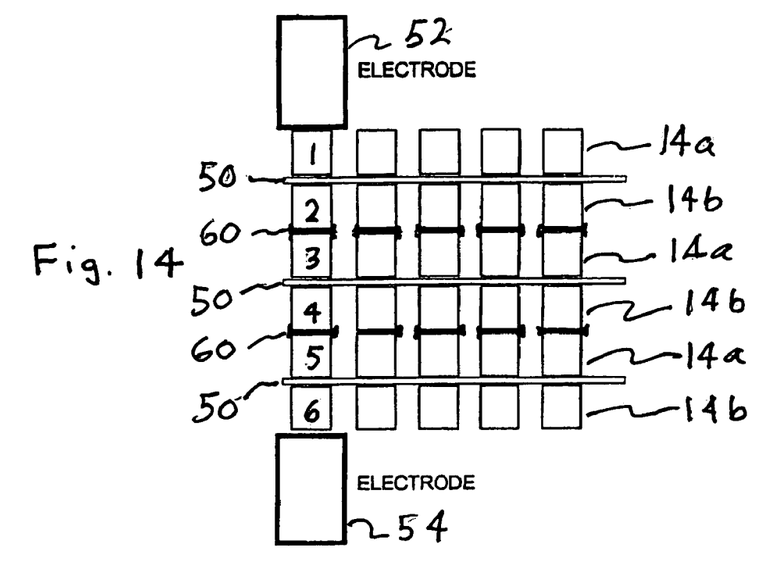
FIG. 14 is an illustration of the method of simultaneously brazing multiple conductors arranged in a row.
Figure 15:
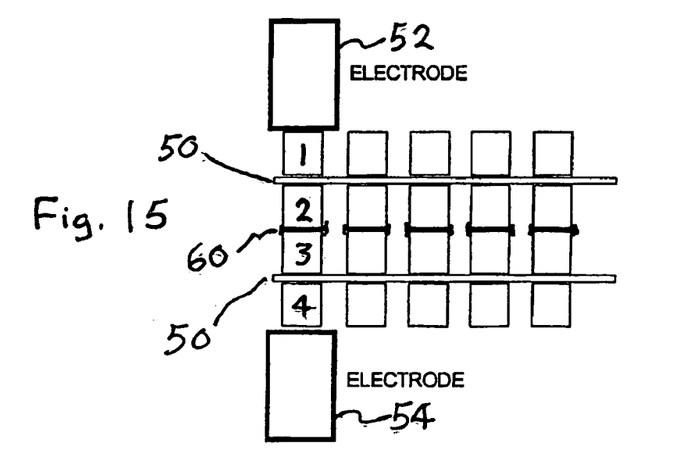
FIG. 15 illustrates another embodiment of the method in accordance with the present invention.
Figure 16:
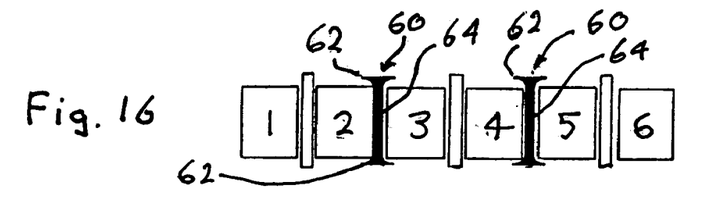
FIG. 16 is an illustration of a row of three pairs of conductor end portions with conductive spacers between the respective pairs.

With reference to FIGS. 14, 15 and 16, a graphical representation of the method in accordance with the present invention is illustrated.

With reference to FIG. 15, a row of conductor segment end portions 1, 2, 3 and 4 are positioned between electrodes 52 and 54 and a conductive spacer 60 is placed between end portions 2 and 3 to maintain the distance "d" illustrated in FIG. 13.

With reference to FIG. 16, spacer 60 comprises an I-shaped member having a flange 62 at each end portion thereof and central linear portion 64 intermediate the two flanges 62. Linear portion 64 is dimensioned to approximate the desired distance "d" to be maintained between the pairs of conductor segment end portions and flange 62 is dimensioned to be larger than dimension d so that the spacer 60 can not slide through the space between the conductor end portions 2 and 3 and 4 and 5. Spacer 60 is typically formed of an electrically conducting material with very low resistance such as copper but can be fabricated from any electrical conducting material such as aluminum and ferrous metal compounds.

FIG. 15 illustrates a method in accordance with the present invention for simultaneously brazing rows of two pairs of conductor end portions together simultaneously and FIG. 14 illustrates the method for rows of three pairs of conductor end portions. In FIG. 15, conductors 1, 2, 3 and 4 are positioned between electrodes 52 and 54, the electrodes are then pressed against the row and electrical current is passed from electrode 52 to 54 as described before. Because spacer 60 is formed of an electrically conducting material, it readily conducts electricity between conductors end portions 2 and 3 while the brazing compound 50 between end portions 1 and 2 and between end portions 3 and 4 is melted. It should be noted in FIG. 15, that the brazing compound 50 comprises an elongated ribbon of brazing compound which extends through multiple rows of conductor end portions. This use of brazing compound ribbon speeds up the brazing operation.

Figure 17:
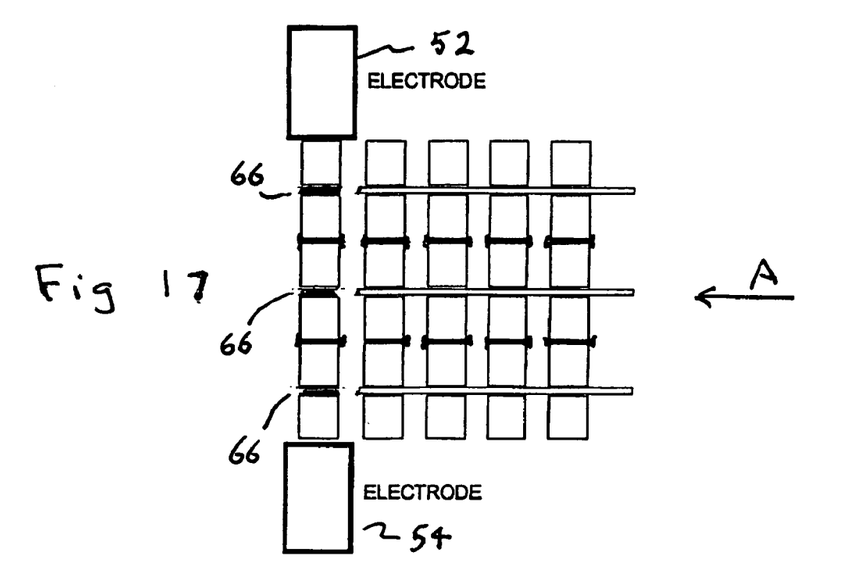
FIG. 17 illustrates another embodiment of a method in accordance with the present invention.
Figure 18:
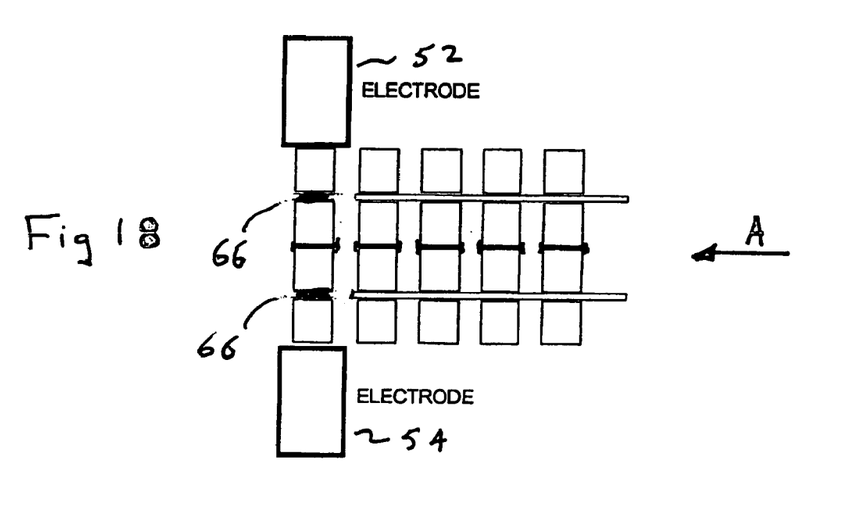
FIG. 18 illustrates another embodiment of a method in accordance with the present invention.

With reference to FIGS. 16 and 17, when electrical current is conducted through a row of conductors by electrodes 52 and 54, the brazing ribbon melts between the conductor end portions to form a brazed electrical junction 66. The melting of the brazing ribbon between the conductors and portions through which the electrical current is passed causes the brazing compound ribbon 50 between the rows to be melted causing a separation of the ribbon between that row of conductors being brazed and the next subsequent row of conductors.

Once the brazing operation on the row is completed, the rows of conductor end portions can be advanced in the direction of arrow A as illustrated in FIGS. 14 and 15 to move the next row of conductor end portions between the electrodes, and the simultaneous brazing operation for that row can be conducted as previously described. As each row of conductors is brazed, the next row can be moved between the electrodes until the entire set of conductor end portions for the stator are brazed.

It should be understood that while FIGS. 14, 15, 16 and 17 show the rows of conductor end portions aligned in straight lines, it should be understood that in a stator core, the end portions would be aligned in a circular configuration as illustrated in FIG. 13 and the stator core would be rotated to cause the rows of conductor end portions to move between the electrodes 52 and 54 sequentially.

Once the brazing operation has been completed for the entire set of conductors, spacers 60 can be removed so that the spacing between the respective pairs of conductors is maintained and there is no electrical connection between the respective pairs of conductors.

It should be understood that various modifications, alterations or changes to the method of the preferred embodiment described herein may be effectuated without departing from the spirit and scope of the present invention as defined in the appended claims.

The invention claimed is:

1. A method of simultaneously brazing adjacent conductor joints comprising the steps of:
   arranging at least a first pair and a second pair of conductor joints in a row, said first pair of conductor joints comprising a first conductor end portion and a second conductor end portion, and said second pair of conductor joints comprising a third conductor end portion and a forth conductor end portion;
   placing a brazing compound between the first and second end portions of the first pair conductor joints and between the third and fourth end portions of the second pair of conductor joints;
   placing a conductive spacer between the second end portion of the first pair of conductor joints and the third end portion of the second pair of conductor joints;
   passing electrical current through the row of the first pair of conductor joints, the conductive spacer and the second pair of conductor joints to cause the brazing compound to melt and braze the first and second end portions together and the third and fourth end portions together;
   removing the spacer.

2. A method as claimed in claim 1, wherein the step of passing electrical current comprises the additional steps of:
   placing a first electrode next to the first end portion of the first pair of conductor joints;
   placing a second electrode next to the fourth end portion of the second pair of conductor joints;
   pressing the first and second electrodes toward one another to form electrical contact with the row; and
   applying electrical potential across the first and second electrodes to cause electrical current to flow through the row.

3. A method as claimed in claim 1, wherein the step of placing a conductive spacer comprises placing a copper brace dimensioned to maintain the normal spacing between the second end portion of the first pair of conductor joints and the third end portion of the second pair of conductor joints.

4. A method of brazing adjacent conductor joints comprising the steps of:
   arranging at least a first and a second pair of conductor joints in a first row, said first pair of joints comprising a first conductor end portion and a second conductor end portion, and said second pair of joints comprising a third conductor end portion and a forth conductor end portion;

arranging at least a third and a fourth pair of conductor joints in a second row spaced apart and adjacent the first row, said third pair of joints comprising a first conductor end portion and a second conductor end portion, and said fourth pair of joints comprising a third conductor end portion and a forth conductor end portion;

placing a brazing compound between the first and second end portions of the first pair and third pair of conductor joints and between the third and fourth end portions of the second pair and fourth pair of conductor joints;

placing a conductive spacer between the second end portion of the first pair of conductor joints and the third end portion of the second pair of conductor joints and between second end portion of the third pair of conductor joints and the third end portion of the fourth pair of conductor joints;

sequentially passing electrical current first through the first row of the first pair of conductor joints, the conductive spacer and the second pair of conductor joints so that the brazing compound melts to braze the first and second end portions of the first pair together and the third and fourth end portions of the second pair together, and next passing electrical current through the second row of the third pair of conductor joints the conductive spacer and the fourth pair of conductor joints to cause the brazing compound to melt to braze the first and second end portions of the third pair together and the third and fourth end portions of the fourth pair together.

5. A method as claimed in claim 4, wherein the step of placing a brazing compound comprises placing an elongated first ribbon of brazing compound between the respective first and second end portions in the first and second rows and an elongated second ribbon of brazing compound between the third and fourth end portions in the first and second rows.

6. A method as claimed in claim 5 where in a multiplicity of rows of conductor joints are arranged adjacent one another and the ribbon of brazing compound extend portions between the multiplicity of rows.

7. A method as claimed in claim 5, wherein the step of placing a conductive spacer comprises placing a copper brace dimensioned to maintain the normal spacing between the second end portion of the first and third pair of conductor joints and the third end portion of the second and fourth pair of conductor joints.

8. A method as claimed in claim 4, where in the step of sequentially passing electrical current comprise the additional steps of:

placing the first row of conductor joints between a first and a second electrode;

pressing the first and second electrodes toward one another to form electrical connection with the first row of electrical joints; and applying electrical potential across the first and second electrodes until the brazing compound melts and brazed the respective end portions of the first row together;

moving the first and second electrodes away from the first row of conductor joints;

moving the second row of electrical joints between the first and second electrodes;

pressing the first and second electrodes toward one another to form electrical connection with the second row of electrical joints; and applying electrical potential across the first and second electrodes until the brazing compound melts and brazed the respective end portions of the second row together.

9. A method as claimed in claim 4, wherein the step of placing a conductive spacer comprises placing copper braces dimensioned to maintain the normal spacing between the second end portions of the first and third pair of conductor joints and the third end portions of the second and fourth pair of conductor joints.

10. A method as claimed in claim 4 where in the step of placing a conductive spacer comprises the step of placing I-shaped members fabricated from an electrically conducting material and having a central portion dimensioned to slide between the respective second and third end portions to maintain the normal spacing therebetween, and having flanges at opposite ends of the central portion dimensioned to be wider than the space between the respective second and third end portions so that said I-shaped member will not slide out of the space between the respective second and third end portions.

* * * * *